United States Patent [19]

Shaper et al.

[11] 3,954,273

[45] May 4, 1976

[54] PHONOGRAPH PICKUP CARTRIDGE

[75] Inventors: Harry B. Shaper, East Hills; Donald G. Litcher, Commack, both of N.Y.

[73] Assignee: Empire Scientific Corporation, Garden City, N.Y.

[22] Filed: Aug. 19, 1974

[21] Appl. No.: 498,513

[52] U.S. Cl. .................................................. 274/37

[51] Int. Cl.² .................. H04R 23/02; H04R 19/06; G11B 3/02

[58] Field of Search ......... 179/100.41 K, 100.41 M; 274/38, 37

[56] References Cited

UNITED STATES PATENTS 3,077,521 2/1963 Ahrens et al. .............. 179/100.41 K 3,469,040 9/1969 Shaper ....................... 179/100.41 K

*Primary Examiner*—Harry N. Haroian

*Attorney, Agent, or Firm*—Ostrolenk, Faber, Gerb & Soffen

[57] ABSTRACT

A quadraphonic phonograph pickup cartridge is constructed with a tubular magnetic armature resiliently supported for vibration on an elastomeric bearing. Performance, especially at high frequencies, is enhanced by mounting a magnetic rod inside the armature on another elastomeric bearing that surrounds the inner rod at a point midway between the ends of this rod.

13 Claims, 9 Drawing Figures

FIG. 1
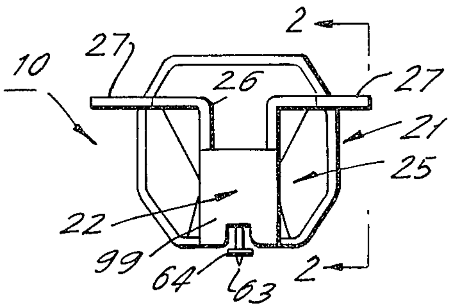
FIG. 2
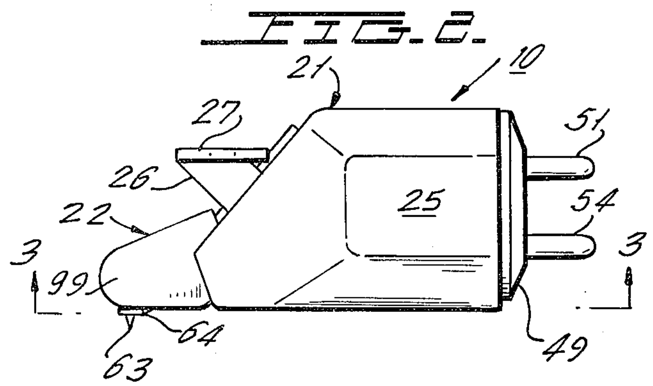
FIG. 5
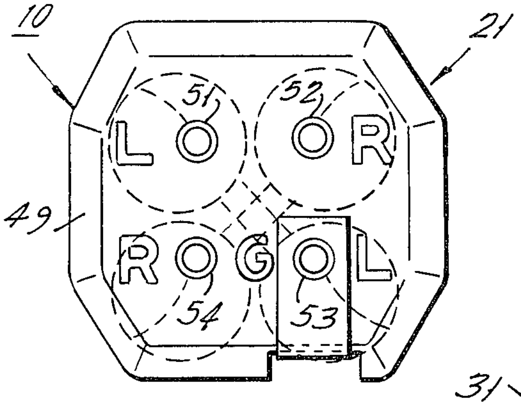
FIG. 3
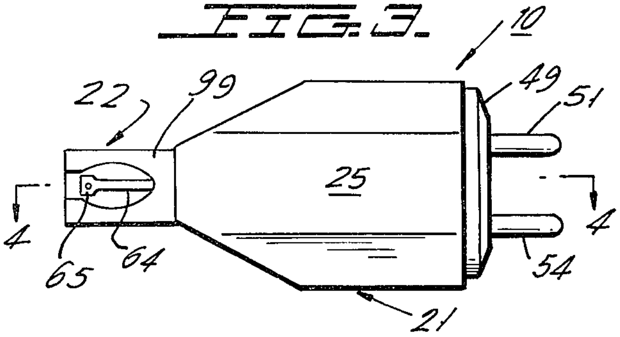
FIG. 4
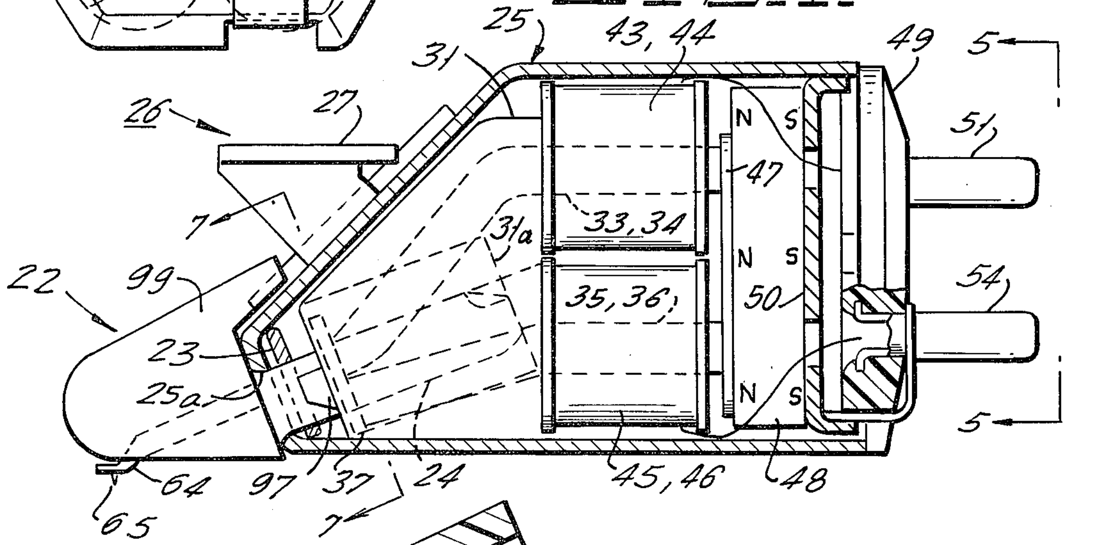
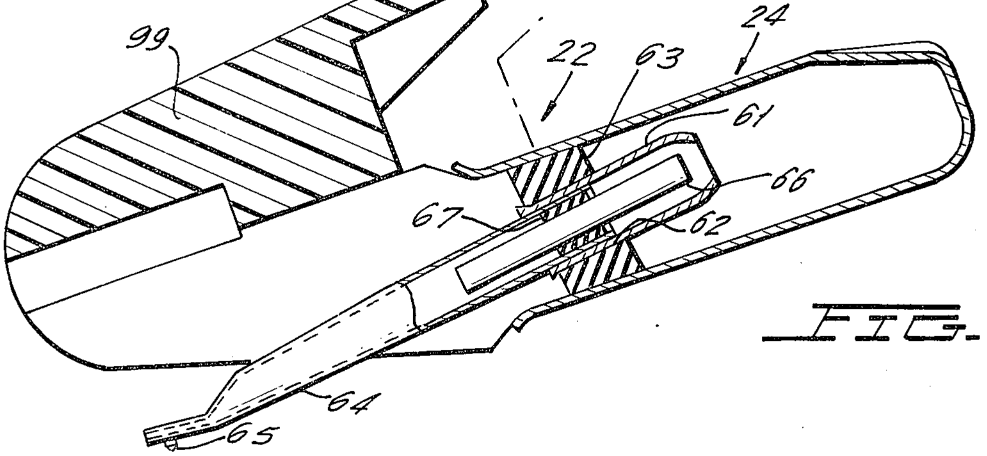
FIG. 6

PHONOGRAPH PICKUP CARTRIDGE

The basic construction for stereophonic (two channel) electromagnetic phonograph pickups having stationary pickup coils is shown in U.S. Pat. No. 2,875,282, issued Feb. 24, 1959, to E. M. Reiback for a Binaural Phonograph Pickup. Refinements of the basic electromagnetic phonograph pickup described in the aforesaid U.S. Pat. No. 2,875,282 are illustrated in U.S. Pat. No. 3,077,522, issued Feb. 12, 1963, to L. Gunter, Jr., et al. for a Stereophonic Phonograph Cartridge and U.S. Pat. No. 3,441,688 issued Apr. 29, 1969, to H. B. Shaper for Electromagnetic Phonograph Pickup Cartridges With Zero Balanced Armature Flux. Commercial versions of the stereophonic phonograph pickups illustrated in the aforesaid U.S. patents are constructed with performance characteristics that include a bandwidth of approximately 20,000 Hz. having a marked resonant peak at the high end of the band. The amplitude of this peak may be diminished by utilizing relatively stiff elastomers and/or springs to provide the restoring force that biases the magnetic armature to a neutral position. However, by adding stiffness to the system, low frequency high amplitude response is adversely affected and higher tracking forces are required, with the latter resulting in more rapid wear of the phonograph records.

A 20,000 cycle bandwidth even with a relatively high resonant peak at the upper end of the band has proven satisfactory for stereo cartridges. However, the requirements for four channel or quadraphonic cartridges are gaining in popularity, and are much more severe, requiring a 40,000 to 50,000 Hz. bandwidth with resonant peaks being limited to a much lower amplitude than is tolerable in a stereo system. The latter requirement is made necessary by the fact that changes in frequency response result in varying system delays, with the result being varying phase shifts throughout the band. The latter condition must be maintained within reasonable tolerances in order for the electronics which receives the signals from the quadraphonic cartridge to faithfully reproduce all four sound channels.

In accordance with the instant invention, increased bandwidth and reduced amplitude resonant peaks are achieved by constructing the phonograph pickup so that its moving system includes a main vibratory system coupled directly to the stylus, as in a stereo cartridge, and an auxiliary vibratory system supported by the first vibratory system. Characteristics of the main vibratory system dominate at the low frequency end of the band, and in this region the auxiliary vibratory system appears to be inertially suspended. At the upper end of the frequency band, vibrations of the two vibratory systems appear to be out-of-phase, thereby substantially reducing the natural resonant peak that would be present in the absence of the auxiliary vibratory system, and also substantially extending the frequency response band.

More particularly, a quadraphonic phonograph pickup cartridge constructed in accordance with the instant invention is provided with a tube-like armature connected directly to the stylus and supported by an elastomer as in conventional electromagnetic phonograph pickups. Disposed within the armature is a rod that extends along the axis of the armature and is spaced therefrom by another elastomer. At the low frequency end of the band, the rod and armature move together and the effect of the rod on frequency response is negligible. However, at higher frequencies the rod is driven into vibration out of phase with respect to the vibration of the armature, thereby producing an anti-resonant effect that results in extended bandwidth and relatively low amplitude of resonance peaks. By constructing the rod of magnetic material, higher amplitude signals are produced in that there is an increased flux concentration at the armature.

Accordingly, a primary object of the instant invention is to provide a novel construction for a quadraphonic phonograph pickup.

Another object is to provide a phonograph pickup of this type that will give high level performance for both quadraphonic and stereo reproductions.

Still another object is to provide a quadraphonic phonograph pickup that requires a very low tracking force.

A further object is to provide a quadraphonic phonograph pickup having improved response characteristics.

A still further object is to provide a quadraphonic phonograph pickup that is economical to produce.

These objects as well as other objects of this invention shall become readily apparent after reading the following description of the accompanying drawings in which:

FIG. 1 is a front elevation of a quadraphonic phonograph pickup cartridge constructed in accordance with teachings of the instant invention.

FIG. 2 is a side elevation of the cartridge looking in the direction of arrows 2—2 of FIG. 1.

FIG. 3 is a bottom view of the cartridge looking in the direction of arrows 3—3 of FIG. 2.

FIG. 4 is an enlarged cross-section taken through line 4—4 of FIG. 3, looking in the direction of arrows 4—4.

FIG. 5 is a rear elevation of the cartridge, looking in the direction of arrows 5—5 of FIG. 4.

FIG. 6 is an enlarged longitudinal cross-section of the replaceable stylus assembly for the cartridge of FIGS. 1 through 5.

Figure 7:
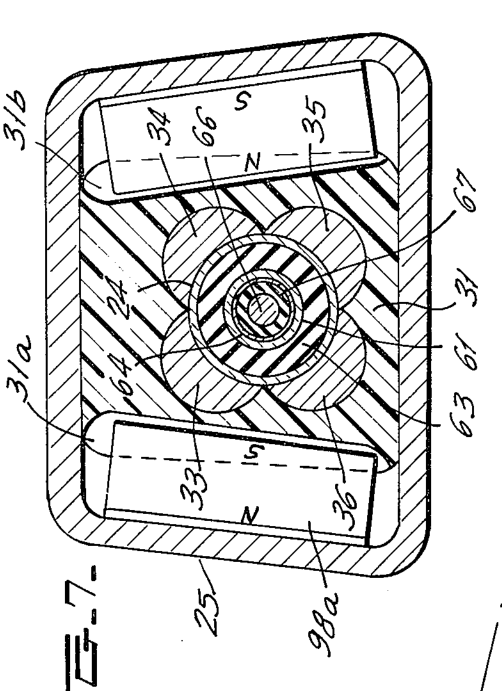
FIG. 7 is a cross-section taken through line 7—7 of FIG. 4, looking in the direction of arrows 7—7.

Now referring to the figures. Quadraphonic phonograph pickup cartridge 10 consists of shield enclosed magnetic core assembly 21 and stylus-armature assembly 22 removably mounted to core assembly 21. The latter includes nylon collar 23 which frictionally engages stylus assembly sleeve 24 to releasably secure stylus assembly 22 to core assembly 21. Collar member 23 is disposed within high mu shield housing 25 at the forward end thereof, with collar aperture 23a and housing aperture 25a being aligned to receive sleeve 24.

Bracket 26 is welded or otherwise secured to the upper forward surface of housing 25. Outwardly extending ears 27 of bracket 26 are provided with slots which receive screws for mounting of pickup cartridge 10 to the tone arm (not shown) of a phonograph, in a manner well known to the art.

Core sub-assembly 30 is disposed within housing 25 and includes at its forward end molded plastic support member 31 having two forwardly extending aligning projections 97 which abut retaining collar member 23.

Support 31 is provided with cylindrical bore 32 which extends therethrough and is aligned with apertures 23*a*, 25*a*, so as to receive stylus assembly sleeve 24.

The forward portions of four elongated rod-like pole pieces 33, 34, 35, 36 of two magnetic core-path systems are encapsulated by pole piece support 31. Prior to encapsulation, the forward ends of pole pieces 33–36 are secured to aligning frame 37 (FIG. 4) constructed of low permeability metal, such as stainless steel. Winding coils 43, 44, 45, and 46 are seated at the portions of the respective pole pieces 33, 34, 35, 36 that extend rearward of support 31. The rear end faces of pole pieces 33, 34, 35, 36 are secured, as by epoxy cement, to transverse magnetically permeable junction plate 47. The latter serves to reduce the reluctance of the core paths.

Figure 8:
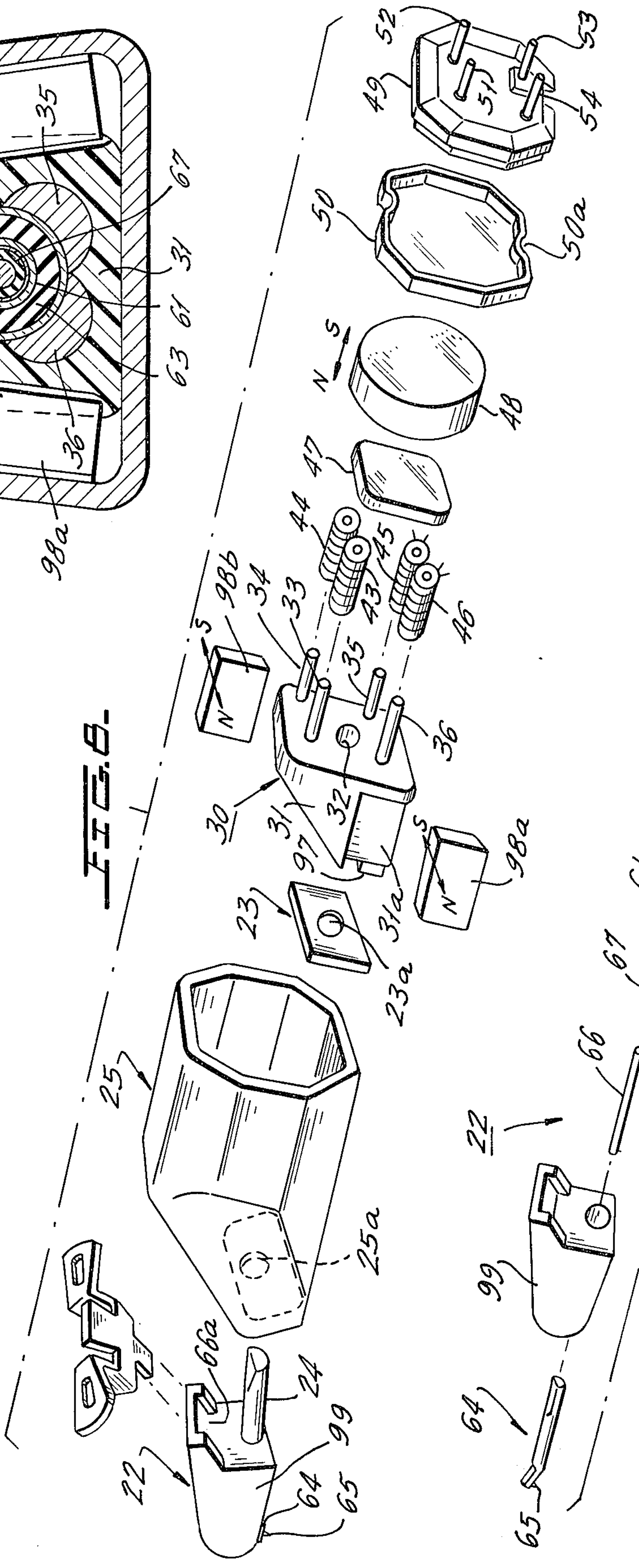
FIG. 8 is an exploded perspective of the main elements of the cartridge illustrated in FIGS. 1 through 5.
Figure 9:
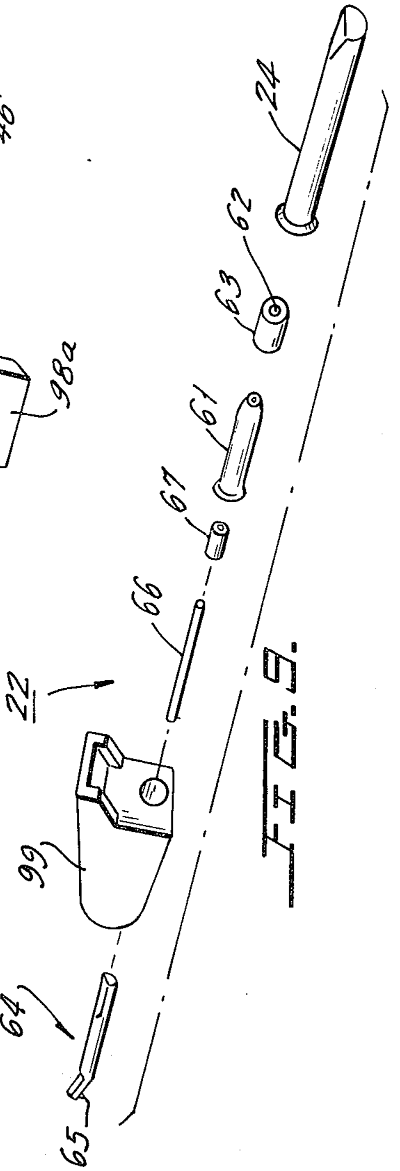
FIG. 9 is an exploded perspective of the elements constituting the replaceable stylus armature assembly of FIG. 6.

One face of permanent magnet disk 48 is cemented or otherwise secured to the rear face of plate 47. Magnet 48 is axially magnetized transverse to the plane thereof or in the elongated direction of pole pieces 33-36, as indicated by the M and S symbols of FIGS. 4 and 8. The rear of shield housing 25 is closed by cover 50 constructed of high mu material. Relatively flat molded plastic terminal support 49 is affixed to the rear face of shield cover 50. Male terminals 51, 52, 53, and 54 are mounted to support 49 and extend to the rear thereof. Notches 50a are provided in cover 50 for the passage of insulation covered leaves from coils 43–46 to terminals 51–54. The particular electrical connections between cooperating coil paths 43, 45, and 44, 46 are made in a manner well known to the art, and require no further descriptions. Flux balancing permanent magnets 98*a*, 98*b* are disposed within pockets 31*a*, 31*b* formed in the sides of pole piece support molding 31.

It is noted that the mechanical elements constituting main core assembly 21 are essentially the same in construction and function as corresponding elements of the stereophonic phonograph pickup disclosed in the aforesaid U.S. Pat. No. 3,441,688.

Removable stylus assembly 22 includes support and assembly sleeve 24 extending rearward from molded plastic nose 99 that is hand-engageable for insertion and removable of stylus unit 22. Disposed within sleeve 24 is permeable magnetic tubular armature 61 that extends through and is seated in aperture 62 of elastomer 63 which resiliently mounts armature 62 and the other movable elements of stylus assembly 22 to support sleeve 24. Elastomer 63 is cemented to both armature 62 and sleeve 24. The rear end of tubular stylus lever 64 extends into armature 61 and is cemented thereto. Stylus 65 is cemented to the forward flattened end of arm 64. Disposed within armature 61 with its forward end projecting into arm 64 is magnetic bar or rod 66. Elastomer 67 surrounds the central portion of rod 66 to resiliently mount rod 66 to armature 61. Elastomer 63 is at the forward end of armature 61, and elastomer 67 is midway between the ends of rod 66, with elastomers 63 and 67 being generally in alignment along the axis of armature 61.

With replaceable stylus assembly 22 mounted to core assembly 21, there is a non-magnetic gap space between the front end of armature 61 and the boundary wall defining aperture 25*a*, with the rear end of armature 61 extending through the non-magnetic gap surrounded by the forward pole-faced ends of pole pieces 34–36 (FIG. 7). Thus, as stylus 65 rides in the sound groove of a moving phonograph record, force imparted to stylus 65 is transmitted through lever 64 to vibrate armature 61 about a pivot center defined by elastomer 63. These vibrations of armature 61 cause changes in position of armature 61 relative to the pole faces at the forward ends of pole pieces 33–36, thereby causing flux changes in pole pieces 33–36 to induce voltages in generating coils 43–46, resulting in electrical signals appearing at output terminals 51–54, with these signals being related to the signals recorded in the sound groove of the phonograph record being played.

At the low end of the frequency response band for cartridge 10, rod 66 appears to be inertially suspended. That is, there does not appear to be any relative movement between rod 66 and armature 61. However, at the upper end of the frequency response band where resonant peaks appear, rod 66 appears to act as an anti-resonant element, with rod 66 vibrating relative to armature 61 with vibrations of armature 61 and rod 66 being out-of-phase. This anti-resonance materially lowers the amplitude of resonant peak and extends the upper end of the frequency response band. The overall amplitude of signals appearing at output terminals 51-54 is enhanced by constructing rod 66 of material having a high magnetic permeability. This acts to increase concentration of magnetic flux in the gap regions through which armature 61 extends.

In a typical construction rod 66 is approximately 0.165 in. long, and 0.0225 in. in diameter. Armature 61 is approximately 0.125 in. long, 0.043 in. outer diameter, with a wall thickness of approximately 0.0015 in. Since the auxiliary vibratory system comprising rod 66 and elastomer 67 is inertially suspended at the low end of frequency band there is no need to make elastomer 67 especially soft. Thus, in a typical construction the stiffness of elastomer 67 is from 1½ to 3 times the stiffness of elastomer 63 in the primary vibratory system. At the very high end of the frequency response band for cartridge 10, both elastomers 63 and 67 act as damping elements.

Although in the foregoing there have been described preferred embodiments of this novel invention, many variations and modificatons will now be apparent to those skilled in the art. Therefore, this invention is to be limited not by the specific disclosure herein but only by the appending claims.

The embodiments of the invention in which an exclusive privilege or property is claimed are defined as follows:

1. A moving section for a multi-channel phonograph pickup; said section including support means; a first vibratory system driven responsive to signals recorded in a phonograph record groove; said first vibratory system including a stylus, armature means, a member connecting said stylus to said armature means whereby movement of said stylus will drive said armature means, and resilient means supporting said armature means on said suppot means for vibratory motion with respect thereto; a second vibratory system including mass means, and another resilient means supporting said mass means on said first vibratory system for vibratory motion with respect thereto.

2. A moving section as set forth in claim 1 in which the vibratory systems are proportioned so that vibrations of said systems are generally out of phase at the upper end of the frequency response band for said moving section.

3. A moving section as set forth in claim 1 in which the second vibratory system is inertially suspended at the low frequency end of the frequency response band for the moving section.

4. A moving section as set forth in claim 1 in which the armature means is tubular and the mass means includes a rod disposed within said armature means.

5. A moving section as set forth in claim 4 in which the another resilient means includes an elastomer surrounding the rod.

6. A moving section as set forth in claim 5 in which the elastomer is located generally midway between the ends of the rod, said rod and said armature means being coaxial.

7. A moving section as set forth in claim 5 in which the resilient means comprises another elastomer surrounding the armature means, said elastomer and said another elastomer being generally in alignment along the axis of said armature means.

8. A moving section as set forth in claim 7 in which the elastomer is located generally midway between the ends of the rod, said rod and said armature means being coaxial.

9. A moving section as set forth in claim 4 in which the rod is constructed of a material having a relatively high magnetic permeability.

10. A moving section as set forth in claim 3 in which the vibratory systems are proportioned so that vibrations of said systems are generally out of phase at the upper end of the frequency response band for said moving section, said rod being constructed of a material having a relatively high magnetic permeability.

11. A moving section as set forth in claim 5 in which the resilient means comprises another elastomer surrounding the armature means, said elastomer having a stiffness substantially greater than the stiffness of said another elastomer.

12. A moving section as set forth in claim 11 in which the stiffness of said elastomer is in the general range of from 1½ to 3 times the stiffness of said another elastomer.

13. A moving section as set forth in claim 1 in which the another resilient means has a stiffness in the general range of from 1½ to 3 times the stiffness of the resilient means.

* * * * *

UNITED STATES PATENT AND TRADEMARK OFFICE

CERTIFICATE OF CORRECTION

PATENT NO. : 3,954,273

DATED : May 4, 1976

INVENTOR(S) : Harry B. Shaper and Donald G. Litcher

It is certified that error appears in the above-identified patent and that said Letters Patent are hereby corrected as shown below:

Column 6, line 4 - please delete "3" and substitute therefor --4--

Signed and Sealed this

*Twenty-eighth* Day of *February 1978*

[SEAL]

*Attest:*

RUTH C. MASON
*Attesting Officer*

LUTRELLE F. PARKER
*Acting Commissioner of Patents and Trademarks*

Disclaimer 3,954,273.—*Harry B. Shaper*, East Hills, and *Donald G. Litcher*, Commack, N.Y. PHONOGRAPH PICKUP CARTRIDGE. Patent dated May 4, 1976. Disclaimer filed Nov. 25, 1977, by the inventors.

Hereby enter this disclaimer to claims 1, 2 and 3 of said patent.

[*Official Gazette April 18, 1978.*]